Figure 1:
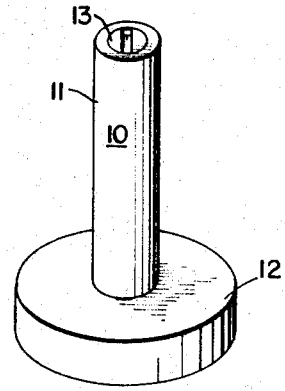

United States Patent

[11] 3,595,072

| [72] | Inventor | Owen Richards<br>4306 Rosemary St., Chevy Chase, Md. 20015 |
|---|---|---|
| [21] | Appl. No. | 843,448 |
| [22] | Filed | July 22, 1969 |
| [45] | Patented | July 27, 1971 |

[54] CONCRETE TESTING MEANS
4 Claims, 6 Drawing Figs.

[52] U.S. Cl............................................... 73/88, 73/95
[51] Int. Cl............................................... G01n 3/00
[50] Field of Search............................................... 73/101, 88 E, 88 F, 140, 141, 88, 95; 264/40; 52/504; 254/29.5

[56] References Cited
UNITED STATES PATENTS
2,305,252 12/1942 Hayden........................ 254/29.5
3,283,566 11/1966 Fietz............................ 73/88

FOREIGN PATENTS
240,077 9/1964 Austria........................ 73/88 (E)

*Primary Examiner*—Richard C. Queisser
*Assistant Examiner*—Marvin Smollar
*Attorney*—Laurence R. Brown ABSTRACT: The strength of concrete or equivalent materials is tested in situ after various degrees of cure by means of one or more test members buried in place in the green concrete slurry. The member has a shank with an enlarged head which can be stressed until the concrete fractures to leave a crater, thus giving a rupture modulus strength value and permitting inspection of the interior concrete structure. Destructive testing is not necessary if a predetermined strength value is to be tested and the concrete withstands the test. This provides a test of the actual conditions found in any structural site and under conditions which may otherwise vary with shape, cure conditions, etc.

INVENTOR
OWEN RICHARDS

BY Laurence R. Brown

ATTORNEY

PATENTED JUL 27 1971 3,595,072

SHEET 2 OF 2

INVENTOR
OWEN RICHARDS

BY Laurence R. Brown
ATTORNEY

CONCRETE TESTING MEANS

This invention relates to means and methods of testing the strength, cure and structure of concrete and equivalent materials, and more particularly it relates to tests conducted in situ after the concrete has undergone a predetermined degree of cure.

The state of the art in concrete testing may be evaluated by reference to the proposed Revised Standard Method of Making and Curing Concrete Compressive and Flexural Strength Test Specimens in the Field, ASTM Designation C31, under consideration by Committee C9 and published by ASTM at their 72nd Annual Meeting June 22, 1969, or to an article by Delmar L. Bloem entitled "Concrete Strength in Structures," pp. 176—187, published March 1968 in Vol. 65 No. 3 of *Journal of the American Concrete Institute*. In the prior art arbitrary measurements have been performed that lead inferentially to assumptions of strength. However, the prior art testing methods do not permit testing in situ under the actual loading conditions present, which may have drastic effects upon the curing, water content, distribution of aggregate, etc. The cure itself varies considerably with site conditions even with uniform concrete constituency. Also the conditions at the surface may bear little relationship to the conditions at various depths in the concrete. Furthermore, the shape, thickness and posture of the concrete has a significant effect upon cure, strength and aggregate distribution. As a result of indirect testing it is not certain that desired strengths are attained and there is a tendency to use more concrete or better quality concrete than necessary to assure that variations in strength do not cause failure at some critical region. It is clear that many prior art testing methods give little if any indication of the actual in-situ strength of concrete structures. There has been some effort in attaining in situ testing in the prior arts as exemplified by U.S. Pat. No. 3,176,053 issued to J.R. Di Stasio, for example. In these methods cores are extracted from the concrete for use in analysis of strength, etc. While Di Stasio cast-in-place cores mark a definite advance in the technology (See Bloem article cited above), the a samples are ordinarily removed to a laboratory for testing. This invention permits true in situ testing.

In addition it is desirable to develop methods and means for testing in situ the strength at various depths, agings and structural positions in a manner that is nondestructive under certain conditions, and which nevertheless can be used to ascertain subsurface conditions when necessary. Any such testing should be reproducible with consistent results that can be evaluated, defined and incorporated in date analyzable and useful to structural engineers, architects and various governmental and industrial bodies responsible for evaluation of concrete structures.

Accordingly it is a general object of this invention to provide improved concrete testing means and methods advancing the state of the art by curing the foregoing deficiencies.

A more specific object of the invention is to provide acceptable means and methods of testing concrete in situ under the actual and specific conditions encountered for each structure or emplacement.

Thus, in accordance with the invention, a test member is provided having a shank with an enlarged head such as a cylindrical disk affixed at one end so that it may be embedded in the green concrete when poured and worked to have the shank flush with the surface. The shank has attachment means such as screw threads by which it may be pulled by external apparatus providing a measured degree of force to determine the strength of the concrete at any age from any desired depth. This permits test of a minimum strength without rupture or the strength of the concrete in terms of a rupture modulus if pulled until fracture resulting in pulling out a crater from the surface. The crater may be inspected for aggregate condition, etc. and may be filled or patched if desired after testing.

Figure 2:
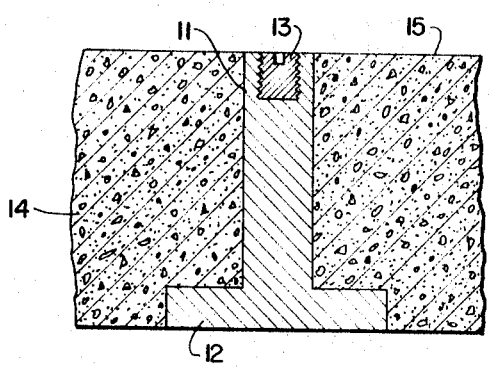
Figure 3:
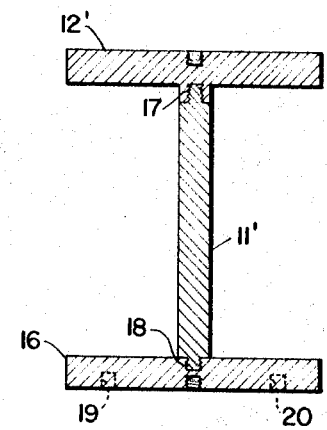
Figure 4:
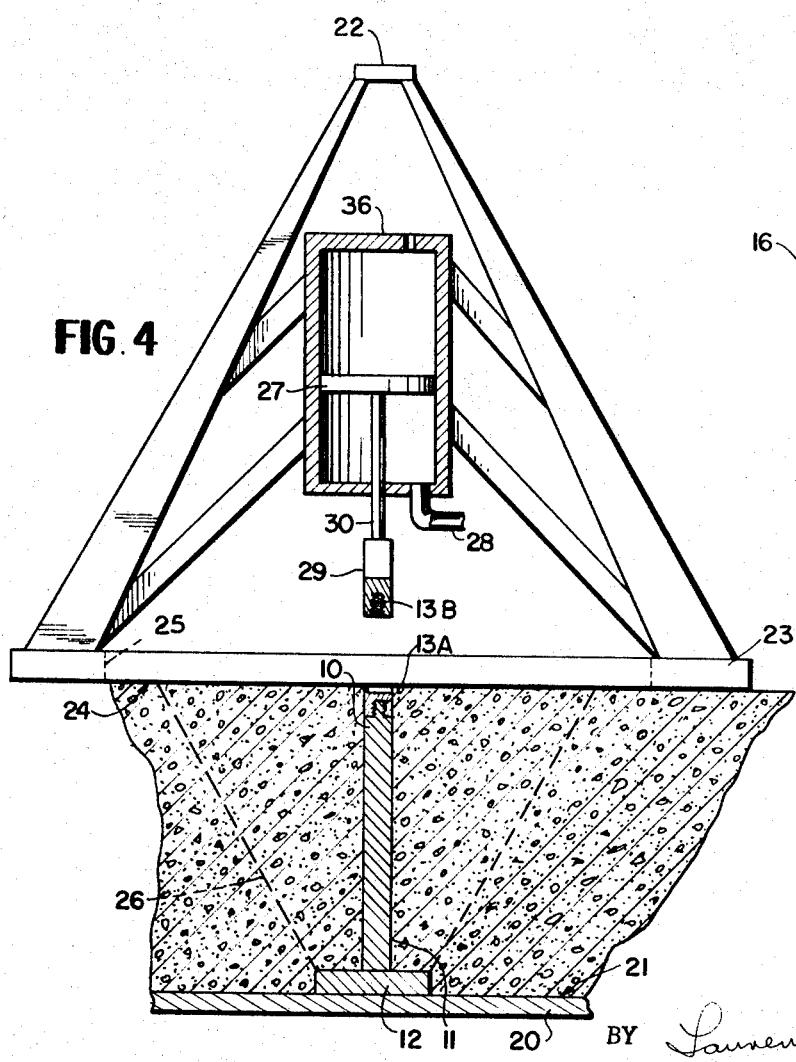
Figure 5:
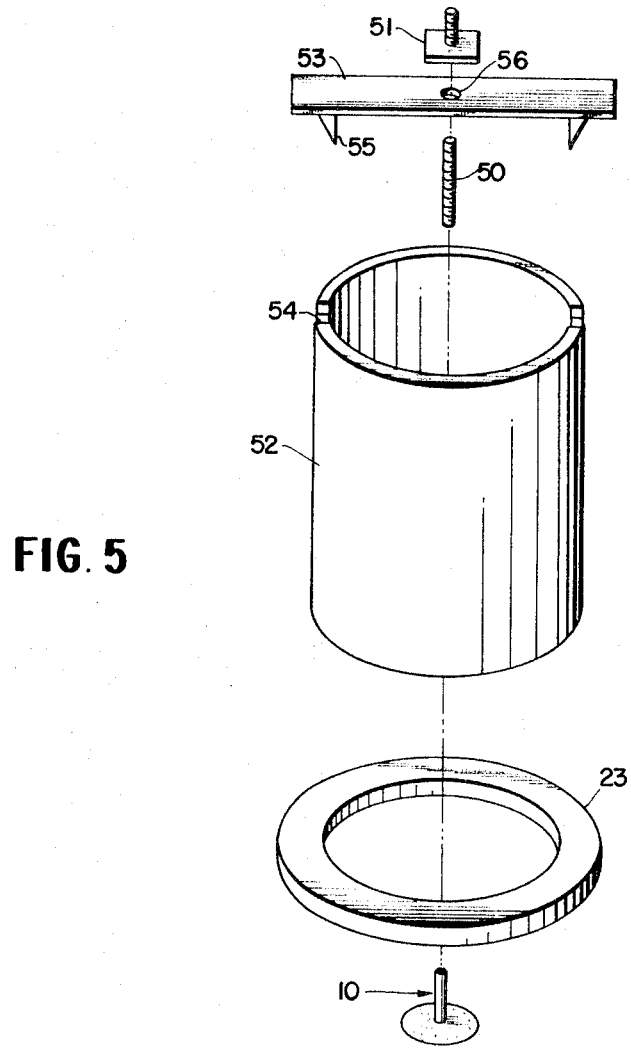
Figure 6:
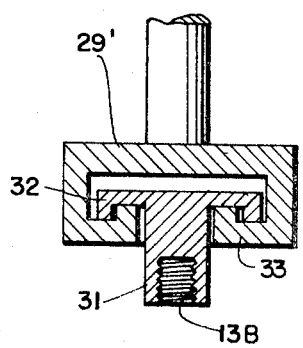

Further objectives, features, advantages and details of the invention will be described throughout the following description, which refers to the accompanying drawing, where:

FIG. 1 is a perspective view of a test member provided in accordance with the invention, FIG. 2 is a side view, in section, of a test member in place in a concrete slab, FIG. 3 is a side view of a modified test member structure, FIG. 4 is an elevation view, partly in section of a structural strength testing system provided by the invention, FIG. 5 is an exploded view in perspective of a further strength testing system provided by the invention, and FIG. 6 is a side view sketch of a quick disconnect test coupling link for attaching apparatus for providing a measured degree of force to the test member.

Now referring to FIGS. 1 and 2, there is shown a test member 10 having a shank 11 and enlarged head 12. The shank has a removable plug 13 screwed into threads on the end of shank 11 disposed internally, so that the test member 10 may be embedded in concrete 14 with the end of the shank 11 flush with a surface 15 thereof. Thus an external testing jig affording some indication of forces used attached to the test member 10 to either twist shank 1 and head 12 or to exert an axial pull along the shank 11 tending to pull head 12 through the concrete body 14. Other sorts of coupling structure may be used, and the shank 11 may extend through the surface in certain installations. It is also noted that the concrete 14 may have variable shapes and thicknesses, and the test member 10 may be advantageously buried therein at different depths and at various locations in a concrete structure or body.

As may be seen from FIG. 3 for concrete slabs a shank 11' may have two heads 12' and 16 disposed flush on opposite surfaces of the slab to permit access form either side. In this case, the heads may be screwed on shank 11 by means of threads 17, 18. For testing in the twisting mode, key slots 19, 20 may be indented in the outer surface of one or more of the heads to receive a twisting wrench.

A test system is illustrated in FIG. 4 for undergoing tests of the concrete slab 14 in which test member 10 is embedded. A concrete form 20 is shown at one surface 21 of the concrete slab 14. A superstructure 22 rests upon an annulus ring 23, placed on the other surface 24 of the concrete slab 14. The annulus ring 23 has an inner circular aperture 25 large enough to pass any conical or crater section 26 tending to be fractured from concrete slab 14 when lifting pressure is applied to the shank 11 of testing member 10 from superstructure 22. For this purpose a hydraulic cylinder 36 is shown with piston 27 moved by a gauged source of air or fluid pressure through inlet 28 so that the strength of the concrete slab 14 may be analyzed. The lift pressure applied may be lower than the rupture modulus which pulls out a crater section 26 or it may provide a rupture modulus reading at any age of cure or at any desired depth in any shape of structure.

A coupling member 29 on piston rod 30 has threads 13B to match those 13A on the test member shank 11 for coupling thereto. Alternatively a quick disconnect attachment might be used as shown in FIG. 6, wherein an intermediate cap 31 may be screwed onto the shank 11 for ready coupling by sliding coupling arms 32 engaging mating structure 33 on the coupling member 29'.

In the view of FIG. 5, an alternative testing system embodiment is shown employing the annulus 23 with test member 10 in a similar manner. The coupling member in this case however may be an extended threaded bolt or pull rod 50 having a nut 51 which can be rotated by a tension measuring wrench to determine applied force. An interspersed spacer member 52 and bridging member 53 hold the pull rod 50 in place over test test member 10. For this purposed centering slots 54 are provided for nesting centering ramp brackets 55 of the bridging member 53, which passes pullout rod 50 through aperture 56.

In using the test members or employing the methods of testing afforded by this invention, procedures may be followed such as found in the following discussion.

A designer contemplates a 20 cm. thick concrete floor of 6 m. span. Allowing for 5 cm. concrete cover thickness under reinforcing mesh at mid span, he wishes to determine the average in place strength of the concrete at 18 hours age with minimum destructive effect. He might use a top surface pullout apparatus with a shank length of 7.5 cm. or half the depth to the bottom tension mesh at the midspan point.

Through the use of a small companion test unit on the job site, ensuring that materials, slump, exposure and other pertinent conditions were as identical to the job slab as possible, he might use a variety of test pullout units of varying shank lengths to satisfy technical requirements as to consistency and predictability of test unit and job slab field performance. With closer correlations, he might go to even smaller head member dimensions, resulting in crater or pullout fracture openings patchable with very minor effort.

Other pullout units could be left in place for variable lengths of time, as for 7, 28, 90 or a greater number of days; units left in permanently could serve a number of purposes:
1. anchor points for temporary partitions
b 2. research or job control check tests to confirm the degree of reliability of increasingly accepted beliefs that concrete strength increases from
   a. lows at the tops of columns to highs at their bottoms;
   b. lower densities at the tops of columns to higher densities at their bottoms;
   c. lows at the surface to highs in the interiors of concrete masses, whether slabs, walls or columns, depending on variables such as curing, water-cement ratio, presence or absence of lightweight aggregate of high or low sorption-desorption index;
   d. lows indicated by damage to diamond drill cut cores when these are taken prematurely or hurriedly or with worn, dull bits and excessive vibration and damage to cores, as opposed to high core strength apt to be obtained from optimum core cutting procedures.
3. long term changes in concrete strength determinations as they may bear on changed usage or load or chemical exposure problems or in post-failure umpire or other studies.

Many other applications of a novel nature will occur to those interested in the technology, especially as members of the industry gain experience in the uses of this invention.

It should be emphasized that structures or other plastic setting masses tested or evaluated by means of this invention will suffer from a removal of a portion of their mass; but that this need not be a serious or in any way a permanent damage; modern technology has developed many materials and techniques for quick, inexpensive and simple patching of such cavities which may even increase the integrity of the patched member.

Possible variations of the fundamental concept of this invention include the following:
1. Use of an elongate member with a flat or disc member placed at either or both ends, each or either being detachable from opposite sides of a slab, wall or other body of material. Thus, tensile, pullout or other force could be applied from either end at the time of test.
2. Use of (a) one elongate member or of (b) two or more axially elongate members with a flat or disc member fixed at central or intermediate points in a slab, wall or other structure. With a plug or cap on both ends of the elongate member, tension, pressure, torsion or other force might be applied from either end of the elongate member.
3. The apparatus of this invention need not be stressed to failure If users prefer, stress need only be applied to selected limits to determine various data such as degrees of elastic flexure, creep, movement or other desired information. Stress need not be applied at all: the apparatus may be sued as a fixed reference point, with index or code identification readily identifiable from the exterior surface.

Among the other advantages or this invention is the avoidance of possible confusion of lost samples, since the test is carried out on the spot and test results immediately recorded, and the data tied to the specific location involved. That this factor is a most important asset will be obvious upon reference to prior art standard methods of test; its importance will be even more strikingly underlined by conversation with any architect, engineer, job superintendent or other person experienced with concrete or similar materials testing, all of whom will have their anecdotes of lost, misidentified, damaged or otherwise distorted test results associated with prior art strength determinations.

Possible uses of test samples include specific gravity aggregate characteristics, segregation, honeycomb, or other determinations, features which to a perhaps lesser extent can be studied in the exposed residual fracture surface before patching. A caution is in order here: concrete strained to failure is accompanied often by visible or incipient fractures of fissures or other alterations which may not make it very closely comparable to unstrained in place material.

Accuracy, reproducibility and significance of tests carried out by this invention will be improved by use of a parting agent (as Vaseline jelly or other material commonly used in the industry to inhibit cement bond or adhesion) on the elongate member. If such a parting agent or bond inhibitor is not used, it is probable that results would vary unnecessarily due to length of elongate member. In similar fashion, it is desirable that the elongate member be of a smooth surface, not readily subject to corrosion. If an elongate member departing from cylindrical, constant diameter should be used, and taper, conical or other departure should be allowed for in interpretation of test results. Similar cautions apply to the disc or flat member, with any eccentricity being allowed for.

Considering the wide range of strength, density and character of plastic setting materials which may be tested by this invention, it is evident that the apparatus shape and dimensions may vary widely, based upon individual applications, as exemplified in the few examples given below:
1. Where a testable material is relatively homogeneous, as in the cases of neat cement, gypsum, resinous or similar plastic setting material, a fairly small diameter dimension in the disc or flat member of the apparatus may yield a satisfactory statistical pattern of test results. Similarly, a mixture of fine aggregate mortar might give satisfactory results with a small disc member, as would be the case with many cellular, foam or similar concretelike or rigid materials.
2. The advisability of larger disc member dimensions is suggested where relatively nonhomogeneous-type materials are to be tested. Thus in relatively lean cement mixes using coarse aggregate of high strengths, or gap-graded aggregate of long size range, larger diameter disc members may be found to give most satisfactory test result distributions. This pattern is reminiscent of the standard requirement in prior art testing of concrete cylinders, where it is common practice to specify that the diameter of the cylinder shall exceed three times the diameter of the coarsest aggregate present.
3. Manner of failure of hardened plastic setting material may vary depending upon a wide variety of factors such as moisture content, strength, brittleness, age, degree of hydration or chemical reaction of cementing element or other ingredient. Thus it is apparent that for any given type of testable material, the application of an interpretation of results should be based on prior experience with the particular material involved. For example, a low-strength foam concrete might tend to fail in the following manner if a disc member of 1 cm. diameter, embedded 5 cm. deep were normally pulled out by a 3 mm. elongate member: an hole little more than 1 cm. in diameter would be left in the lower several cm. of the cavity, with the diameter gradually increasing towards the surface, at which a crater-shaped fracture probably not in excess of 1 cm. deep and several cm. in diameter might be formed. Considering low density concretes of slightly greater strength and density, the presence of aggregate such as perlite might tend to increase the diameter of the hole and result in a larger surface crater. Reduction in the air-content of a perlite concrete might tend to enhance the dimensions of hole and crater. Use of a heavier pumice aggregate should further increase the size of the resulting hole. Use of so-called structural lightweight concretes made with expanded shale, clay, slag, or fly-ash aggregate would result in larger holes and deeper, broader craters. In these cases, disc and elongate members of greater strength and diameter dimensions should be considered, although increase in the length of the elongate member by the same ratios might not be found so desirable. Practice may demonstrate that an elongate member of at least three times that of the coarsest aggregate particle (say 6 cm. for 2 cm. aggregate concrete) is desirable.

4. Failure in flexure of stressed slab, as opposed to the crater-type failure described above, would offer less significant and reproducible results. Therefore, an important feature of this invention is a method to limit failures to a crater-type rather than flexural or other types.

One device to attempt to ensure crater-type failure is described below:

The apparatus to transmit force parallel and axially to the elongate member, considering that for the purposes of present description an upward vertical pull on an elongate member embedded in a horizontal-surfaced concrete slab be used, would be supported at its base by a circular annulus of sufficient surface area to render the counter force opposing the pullout force not harmful to the surrounding surface.

Further, the diameter of the inner dimension of the annulus should be so suited to the failure characteristics of the material under test that a crater-type failure be insured.

Details of the apparatus exerting the pullout force would follow from good engineering design, but the following factors are mentioned for the purpose of general guidance:

1. The load should be relatively uniformly transmitted about an annulus of sufficient strength and inflexible integrity that the pressure on the bearing surface will not produce observable disfiguration.

2. The pullout force should be vertical (normal, that is perpendicular) to the surface of the material being tested. Generally, the pullout force should be linear, that is, nontwisting, nonspiral, nonalternating, nonreversing in character.

Note: Among other possible variations of this invention is the following, which might have peculiar applications such as with cellular, low-strength concretes: rotating pullout of a perforated disc member with abrading grooves on its upper or perhaps peripheral surface or surfaces.

3. The pullout should be applied at a rate of increase generally consistent with those found to give greatest reproducibitity as reported in ASTM and similar methods of test.

Principals outlined above apply equally to testing of walls, columns, inclined or curved surfaces.

I claim:

1. In testing of concrete structures in which a test member, adapted for and calibrated with known dimensions specifically for measuring the strength of concrete from one surface, is embedded in the concrete, and a measurable force is applied to said test member, said test member comprising a shank with an enlarged head with the outer end of the shank flush with said surface of the concrete, said shank having means to enable said measurable force to be applied to said test member from the surface of the concrete, thereby attempting to move the enlarged head in the concrete.

2. A test member as defined in claim 1 wherein the shank is removably affixed to said head by means of screw threads.

3. A test member as defined in claim 1, wherein the test member means to enable said measurable force to be applied comprises an internally disposed threaded cavity in said shank.

4. A test member as defined in claim 3 including a removable plug in said threaded cavity.